March 17, 1936.  H. D. SILL  2,034,360

RIM CONSTRUCTION AND METHOD OF MAKING THE SAME

Filed Oct. 14, 1932

Inventor
Harold D. Sill
by
Attorney

Patented Mar. 17, 1936

2,034,360

UNITED STATES PATENT OFFICE 2,034,360

RIM CONSTRUCTION AND METHOD OF MAKING THE SAME

Harold D. Sill, Jackson, Mich.

Application October 14, 1932, Serial No. 637,727

3 Claims. (Cl. 29—159.1)

The present invention relates to an improvement in wheel rim constructions and has particular reference to wheel rims for pneumatic tires for automobiles and airplanes.

Heretofore wheel or tire rims have been constructed from uniform steel sheet stock. The usual operation has been to form the sheet into a hoop by a suitable welding operation and then fabricate the hoop into the desired cross sectional contour by a series of rolling operations. Sheet stock of uniform thickness has necessarily resulted in the production of rims of uniform thickness throughout, in view of the difficulties encountered in attempting to roll sheet material into sections of varying thickness. In view of this fact, rims are at the present being constructed of stock of sufficient thickness throughout to meet the requirement of strength in localities where the stresses are the greatest. This has resulted in a rim which is unnecessarily heavy and has prevented the general adoption of rims fabricated from lighter and necessarily more expensive metals than steel, notwithstanding the fact that light weight wheel rims are highly essential in contributing to rapid starting and stopping of a motor vehicle.

Thus it becomes the primary object of my invention to provide a light weight wheel or tire rim characterized by having variable cross sectional thickness in certain localities to provide the requisite strength.

Another object is to provide a rim structure having sufficient strength yet requiring a minimum amount of metal in its fabrication thus enabling the commercial adoption of light aluminum alloy rims.

A further object is to provide a method of rim fabrication which will enable present methods of construction to be materially simplified.

These and other objects and advantages will appear as the description proceeds. It is to be distinctly understood, however, that I do not wish to be limited to the exact details hereinafter set forth, but intend to include as part of my invention all such changes and modifications that would occur to those skilled in the art and fall within the scope of the appended claims.

In the accompanying drawing wherein several of the many possible forms which my invention is susceptible of taking are shown for the purpose of illustration, Fig. 1 is a cross sectional view of a dropped center rim embodying my improved construction.

Figure 1:
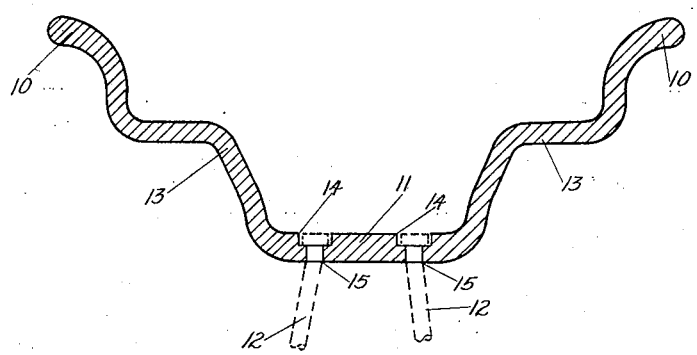

In carrying my invention into operation the material, from which the rim is to be fabricated is heated, preferably in the form of an ingot, until it becomes sufficiently plastic to be extruded through forming dies. By way of example only and without limiting my invention to any particular metal other than those capable of being extruded, very satisfactory results have been obtained by heating a nickle-chromium aluminum alloy up above 800 degrees and extruding the metal under a pressure in the neighborhood of 50,000 pounds per square inch. In lieu of the present practice of imparting the transverse contour by a series of rolling operations effected in the majority of cases after a uniform band of sheet material has been welded to form a hoop, according to my improved method the rim is given substantially a finished contour in the extruding die. Preferably, in extruding a rim of the character shown in the drawing, the rim is slightly oversize in cross section in order to provide for the usual expanding operation subsequent to the welding operation.

After the extruding operation the rim channel is bent to the desired circular shape either hot or cold and the opposed ends are welded or otherwise secured in any well known manner. Finally the rim is heat treated to produce the required strength. In rolling the straight channel into a hoop, it is necessary that the fabricated material be characterized by the ability to withstand a substantial elongation which is maximum at the edges.

It will be apparent that by eliminating the usual rolling operation and extruding substantially the finished contour of the rim in one operation, the section of the rim may be varied at will to provide thicker portions where strength is needed and thinner portions where lightness and not strength is a factor.

Although in its broad conception, this invention is not limited to any particular extrudable material, it is of considerable importance in the development of a commercially practical rim of aluminum alloys susceptible to heat treatment. In order to provide sufficient strength in certain portions of the rim, especially at the point where the spokes are anchored, it is necessary under present practice to provide a rim of uniform thickness. This resulted in the employment of a prohibitive amount of a relatively costly material. If an attempt is made to fabricate an aluminum alloy rim under the present method of substantially the same thickness as a steel rim, an aluminum alloy of sufficient ductility, to withstand the usual cupping operation to provide for the spokes, would be deficient in strength. In accordance with the present invention, the portion of the rim where cupping operation is generally done, may be thickened and the operation can be performed by machining or countersinking. As will be hereinafter more fully described with reference to the drawing, the portion of the rim where the cupping operation is usually performed, may be provided with an extruded groove or other peripheral depression to receive the head of the spoke. This enables a seat to be provided for the head of the spoke which is not possible in the usual cupping operation. In present construction the cupped portion of the rim, in which is anchored the high carbon steel spokes, is a region of frequent failure. This results from the necessity of employing a material sufficiently ductile after being subjected to the hardening effects of the series of rolling operations to withstand the cupping operation.

In order that my invention may be clearly understood, in Fig. 1 is shown one practical application of my invention to the usual dropped center type of rim employed in a wire wheel. The contour shown is substantially that of the extruding die although it is not necessary that the entire forming operation takes place in the extruding operation. In some instances the employment of the extruding die to provide variation in thickness of certain sections and the employment of rolling operations to provide the major contour of the rim may be advantageous. As shown the edges 10 and the base 11, in which the spokes 12 are anchored, have been thickened in the extruding die to provide the necessary strength while the intermediate sections have been thinned to provide the necessary lightness.

In the illustration, peripheral depressions 14 have been provided in the extruding operation to constitute seats for the upset spoke heads projecting through machined apertures. Obviously, in lieu of the extruded peripheral depressions 14, the seat receiving the spoke head may be machined or countersunk in any well known manner. The ability to increase the thickness of the base 11 is likewise of importance when steel or wooden spokes are anchored in the base.

Obviously, the section to be thickened is largely a matter of choice and depends entirely upon the type of rim employed. In rims in which the wire spokes are anchored to the sides of the rim rather than at the base, the sides in the locality of the anchorage would be thickened. Likewise, the type of thickening is a matter of choice, tapered and uniform sections of increased thickness or ribs being employed as a matter of design.

Figure 2:
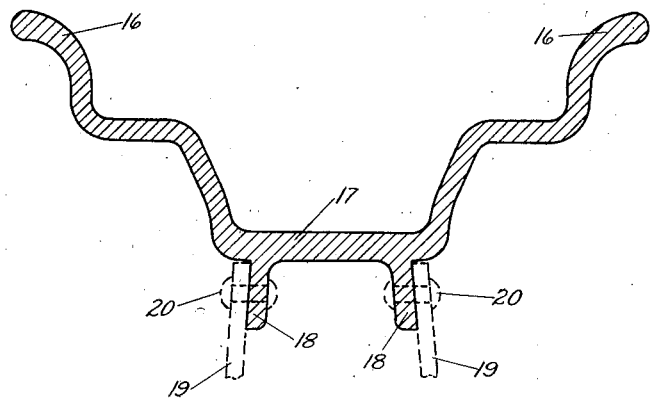
Fig. 2 is a cross sectional view of a modified type of rim especially adapted for a disc wheel.

In Fig. 2, in addition to the provision of thickened stock at the edges 16 and bottom 17 where strength is required, convenient and economical attaching means for discs wheels have been provided by extruding reinforcing and attaching flanges 18 integral with the base 17 to which discs 19 may be secured in any well known manner, such as by rivet 20.

Figure 3:
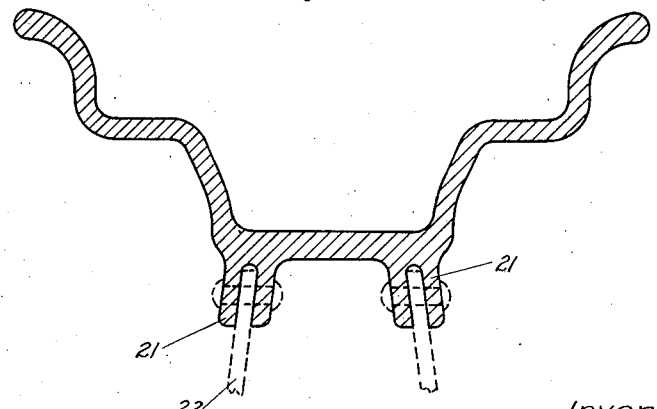
Fig. 3 is a cross sectional view of a further modification especially adapted for a disc wheel.

As shown in Fig. 3, a slight variation of the structure shown in Fig. 2 is provided by forked flanges 21 which are displaced inwardly, subsequent to the extruding operation and the insertion of the disc 22, to rigidly anchor the disc 22 in the position shown.

In carrying out my improved method of rim fabrication, when light aluminum alloys susceptible to heat treatment are employed, the rim after being welded or otherwise formed into an annular shape is preferably heat treated prior to the expanding operation resulting in the finished contour. However, it may be advantageous with certain alloys to partially expand the rim prior to heat treatment and then complete the expanding operation subsequent thereto.

Having thus described my invention, what I claim as new and desire to protect by Letters Patent is:

1. The method of manufacturing a wheel or tire rim and the like, comprising extruding a light aluminum alloy susceptible to heat treatment into substantially a straight bar having a transverse contour simulating the finished rim, forming sections of said bar into an annular shape, securing the opposing ends of the sections together in a suitable manner, heat treating the fabricated sections, and imparting the finished contour to the sections.

2. The method of manufacturing a wheel or tire rim and the like, comprising extruding a light aluminum alloy susceptible to heat treatment into a channel simulating the transverse contour of the finished bar, said channel being of uneven thickness, forming sections of said channel into an annular shape, securing the opposing ends of the section together in a suitable manner, heat treating the fabricated sections, and imparting the finished contour to the sections.

3. A tire rim fabricated from an extruded channel of light weight aluminum alloy susceptible to heat treatment, said rim having a drop center felly and stepped side portions, the outer edges of said side portions and said felly being thickened.

HAROLD D. SILL.